(12) United States Patent
Bauer

(10) Patent No.: US 7,618,088 B2
(45) Date of Patent: Nov. 17, 2009

(54) BUFFER STOP FOR A MOTOR HOOD OF AUTOMOBILES

(75) Inventor: Christian Willrich Bauer, Karlsfeld (DE)

(73) Assignee: ITW Automotive Products GmbH & Co KG, Iserlohn (DE)

( * ) Notice: Subject to any disclaimer, the term of this patent is extended or adjusted under 35 U.S.C. 154(b) by 0 days.

(21) Appl. No.: 12/091,764

(22) PCT Filed: Oct. 17, 2006

(86) PCT No.: PCT/IB2006/002894

§ 371 (c)(1), (2), (4) Date: Apr. 28, 2008

(87) PCT Pub. No.: WO2007/057731

PCT Pub. Date: May 24, 2007

(65) Prior Publication Data

US 2008/0284210 A1 Nov. 20, 2008

(30) Foreign Application Priority Data

Nov. 18, 2005 (DE) .................. 10 2005 055 071

(51) Int. Cl.
*B60N 99/00* (2006.01)
(52) U.S. Cl. .............................. 296/207; 16/82; 16/86 R
(58) Field of Classification Search .................. 296/207; 16/82, 86 R
See application file for complete search history.

(56) References Cited

U.S. PATENT DOCUMENTS

| 6,039,388 | A | * | 3/2000 | Choi ........................ 296/207 |
| 6,088,878 | A | * | 7/2000 | Antonucci et al. .......... 16/86 A |
| 6,119,306 | A | * | 9/2000 | Antonucci et al. .......... 16/86 A |
| 6,637,810 | B2 | * | 10/2003 | Kisiler et al. ............... 296/206 |

FOREIGN PATENT DOCUMENTS

| DE | 10352643 A1 | 6/2005 |
| EP | 1 482 119 A1 | 12/2004 |
| EP | 1659249 A1 | 5/2006 |
| WO | 2004083020 A2 | 9/2004 |

OTHER PUBLICATIONS

ISR for PCT/IB2006/002894 dated Mar. 6, 2007.

* cited by examiner

*Primary Examiner*—Lori L Lyjak
(74) *Attorney, Agent, or Firm*—Lowe Hauptman Ham & Berner LLP

(57) ABSTRACT

An automobile hood bumper includes a sleeve-like seat fitted with an axial passage and an external thread that can be screwed into a hole of a sheet-like support, an upper segment having a rest head and a shank. A connection member joins the shank to the seat to release said shank when an axial force acting on the upper segment exceeds a predetermined magnitude, whereby the shank moves into the axial passage until the rest head comes to rest at the associated end of said seat. A deceleration element is configured at the outside of the shank and/or in the axial passage to generate a decelerating force by friction and/or by elastic/plastic deformation and to decelerate the penetration of the shank into the axial passage.

18 Claims, 2 Drawing Sheets

BUFFER STOP FOR A MOTOR HOOD OF AUTOMOBILES

RELATED APPLICATIONS

The present application is based on International Application Number PCT/IB2006/002894, and claims priority from German Application Number 10 2005 055 071.1 filed Nov. 18, 2005, the disclosures of which are hereby incorporated by reference herein in their entirety.

BACKGROUND

The present invention relates to an automobile hood bumper.

Conventionally a hood is connected by hinges to the automobile body. When in its closed position, it is held in place by appropriate locking means. In said closed position, the hood rests on two or more stops in the form of resilient bumpers. It is known to make such bumpers of soft and preferably elastomeric and cylindrically shaped plastics; they are fitted externally with a thread allowing screwing them into a hole in a support. The bumpers are screwed into said holes until the hood comes to a stop on them at the right hood gap.

SUMMARY

The objective of the present invention is to create an automobile hood bumper which moreover offers a decelerating or damping effect when there is collision between a pedestrian and the hood.

The bumper in an embodiment of the present invention comprises a sleeve-like seat and an upper segment. The sleeve-like seat is fitted with a preferably cylindrical and axial passage. The bumper is externally fitted with a thread allowing screwing it into a hole in a sheet metal support. The upper segment is fitted with a rest head and a shank. The shank is affixed by a connecting means to the seat. The connecting means may be made by integration into the seat. In this design the bumper is integrally made by injection molding. Alternatively a detent connection may be provided between said shank and the seat. The connecting means is designed in a manner that said shank shall be released when a predetermined axial force or impact acts on the rest head of the upper segment, whereby said shank shall be displaced into the axial passage. This motion ends once the upper segment rests against the end of the seat opposite it.

Decelerating means are provided at the shank outside and/or at the axial passage, said means generating a decelerating force by friction and/or due to elastically or plastically deformed material, and decelerating the shank motion in the axial passage.

In the event of hood-passenger collision, this hood is able to elastically yield by being forced downward, and/or obliquely, over a given path, and being decelerated or damped along that path. In this design the impact on the pedestrian is softened and accordingly the danger of injury is reduced.

The magnitude of the deceleration and the deceleration function (of distance) along the path covered may be adjusted as desired by the deceleration means. In one embodiment of the present invention, said means assure that the deceleration force remains approximately constant along the path of the rest head as far as the seat. However said force also may rise or fall continuously in various manner, or stepwise. Moreover the deceleration force may alternatively rise or fall along the path of deceleration. Any appropriate function of distance of the deceleration force is covered by the present invention. A telescoping configuration of several upper segments and seats may be used to save space, the upper segments being displaced consecutively into associated seats after a predetermined force, i.e. an impact, has been applied to the first upper segment.

Mention was made above that, in an embodiment of the present invention, the bumper may be manufactured integrally of plastic. In a further embodiment of the present invention, the bumper is manufactured by two-component injection molding, part of the rest head and of the upper segment shank and a sleeve of the seat being molded from a hard plastic whereas the external thread and top of the rest head are molded using an elastomeric material. The sleeve may be fitted at its end facing the rest head with a radial flange whereby said sleeve impacts the end of the seat when due to an external impact it is displaced into the seat. Moreover the sleeve may be fitted with several axially-apart ribs imbedded in that segment which is constituted by the external thread of the seat.

To generate the decelerating or damping effect, one embodiment of the present invention calls for the shank and/or the axial passage being fitted with at least one annular rib or at least circumferentially spaced radial protrusions of which the radial extension is larger than the inside diameter or at least the diameter of the entry zone of the axial passage. When they are forced into the axial passage, the ribs or protrusions deform plastically and they may even warp the seat. Such deformation requires a given force acting as the decelerating force in the event of an impact on the hood. In an alternative to the decelerating means described just above, the shank may be fitted externally, or the axial passage may be fitted at its wall with several ribs running parallel to the axis, the radial extension of said ribs being larger than the inside diameter or the diameter of at least the entry zone of the axial passage. In case the ribs are situated inside the passage, their radial inward extension will be larger than the shank outside diameter. The ribs' cross-section may be arcuate, rectangular or triangular. Other cross-sections are also applicable. The ribs may have a constant radial extension from the rest head to the seat, or the radial extension may become smaller or larger. The selected radial extension will determine the decelerating force function of distance during the shank's axial displacement into the axial passage.

Lastly, several rows of axially spaced-apart protrusions may be constituted circumferentially on the shank, their radial extension being larger than the passage diameter or at least its entry zone diameter. The radial extension of the individual protrusions can be constant, or increase or decrease in the axial direction from the connecting means to the rest head. It is understood that the scope of the present invention also includes decelerating protrusions configured in arbitrary manner at the shank and/or the passage surface.

Moreover the shank and the passage may be conical. In this embodiment the decelerating force increases as the shank is inserted farther into the passage.

The shank may be guided in the axial passage by means of appropriate guide elements. The stop element of the seat may be fitted at its external side with wrench/key faces to allow turning the bumper by means of its thread into the support hole without thereby rotating the upper segment. At its end facing the said rest head, the upper segment may be fitted with radially spaced protrusions which are spaced apart in a manner that the rest head shall be held irrotationally between the said protrusions when it comes to rest against the associated end of the seat.

BRIEF DESCRIPTION OF DRAWINGS

Illustrative embodiment modes of the present invention are elucidated below in relation to the appended drawings.

DETAILED DESCRIPTION OF EMBODIMENTS

Figure 1:
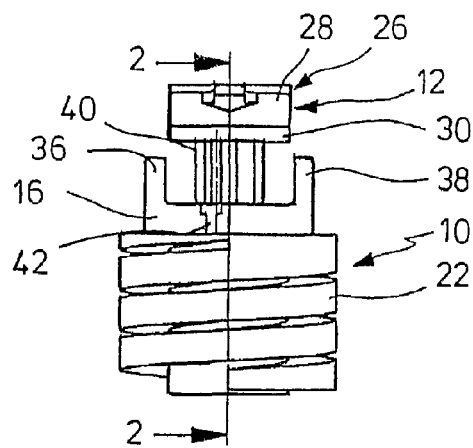
FIG. 1 is a sectional side view of a first embodiment.
Figure 2:
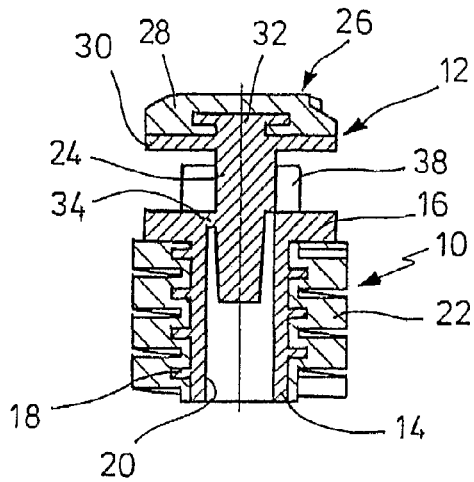
FIG. 2 is a section of the embodiment shown in FIG. 1 along the line 2-2.
Figure 3:
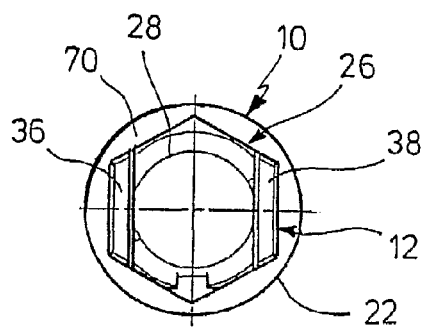
FIG. 3 is an upper segment view of the bumper of FIG. 1.
Figure 4:
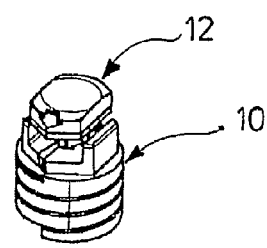
FIG. 4 is a perspective of the bumper of FIG. 1.

The bumper of FIGS. 1-3 comprises a seat 10 and an upper segment 12. The seat comprises a sleeve 14 fitted at its upper end with a radial flange 16. Moreover the sleeve is circumferentially fitted with a helical rib 18. at its inside the seat comprises a cylindrical passage. A thread 22 is configured at the outside of the sleeve 14. The sleeve 14 per se is made of a hard plastic, whereas the thread 22 is molded from a soft, elastomeric plastic.

The upper segment 12 comprises a shank 24 and a rest head 26. The rest head 26 in turn comprises a contacting element 28 and a flange 30 receiving said contacting element. A T-section element 32 is enclosed by the contacting element 28 which is also made of a soft, elastomeric plastic material.

The shown components constitute an integral unit, the shank 24 being connected by a rupturing means 34 to the sleeve 14 at the level of the flange 16. Part of the shank 24 underneath the rupturing element 34 enters the passage 20.

Two walls 36, 38 rise from the flange 16 with which they are integral and run parallel to and apart from each other.

When integrally molding the bumper, the soft plastic must be able to flow from the contacting element 28 through appropriate ducts to the thread 22. This feature is indicated by 40 and 42 in FIG. 1.

Figure 5:
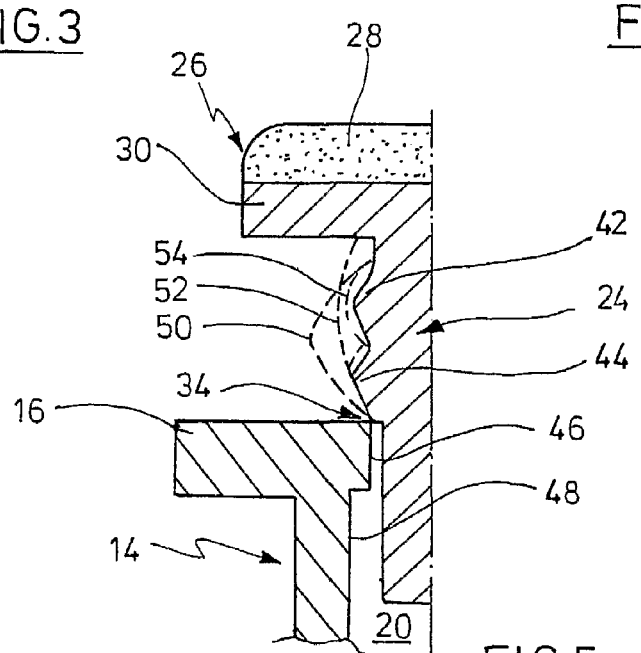
FIG. 5 is a schematic section of another embodiment mode of a bumper of the invention.

The design of the rupturing means 34 implies a force which drives the shank 24 downward through the position shown in FIG. 2 and which might be less or larger than the force needed to rupture the connecting means 34. Illustratively the diameter of the shank 24 may be larger than that of the passage 20. FIG. 5 indicates another option. The shank 24 may be fitted at its circumference with two axially apart annular ribs 42, 44 which radially project outward beyond the entry element 46 of the sleeve 14. Upon rupturing the connecting means 34, the annular ribs 42, 44 and/or the entry element 46 must elastically and/or plastically deform enough to allow driving the shank 24 into the passage 20. FIG. 5 also shows that the diameter of the passage 48 is somewhat larger underneath the entry element 46, as a result of which the annular ribs 42, 44 may move relatively unhampered in that zone.

Instead of exhibiting a cross-sectional contour such as indicated above for said annular ribs 42, 44, they also may exhibit a contour as indicated by the dashed lines 50, 52 or 54. The selection of such a contour and of its matching contour in the said seat depends on the deceleration behavior desired along the path covered by the rest head 26 from the position shown in FIG. 5 as far as the flange 16.

The seat 10 is sketched in perspective in FIGS. 6 through 9, only part of the upper segment's shank being shown in perspective. The upper segment is omitted for clarity of exposition. One may note that above its junction to the sleeve (not seen in FIGS. 6-9), the shank comprises different cross-sectional contours.

Figures 6, 7:
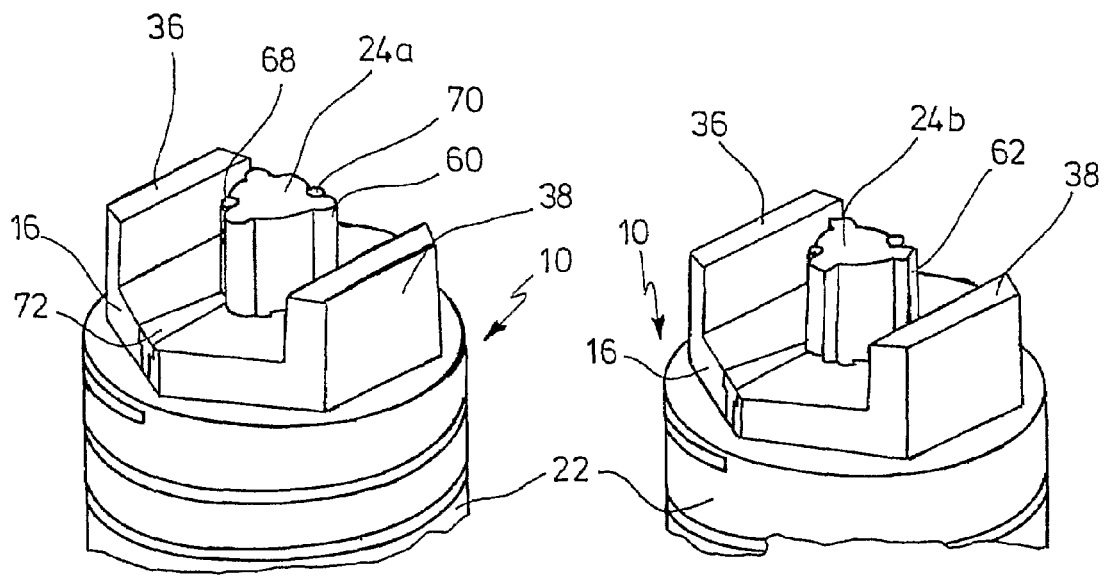
FIGS. 6-9 are various perspectives of a shank of a upper segment of a bumper in accordance with embodiments of the invention.

The shank 24a of FIG. 6 is cross-sectionally circular and is fitted with annular ribs 60 equidistant from each other by 120°. The radial extension of said ribs however exceeds the diameter of at least the entry zone 46 of the sleeve 14, entailing deforming the ribs 60 and possibly the entry zone 46 when, following rupturing the connection means, the shank shall be driven deeper into the seat 12. The ribs 60 may match the passage gradually in order that the initial deformation shall not be excessive.

The shank 24b of FIG. 7 also is fitted with three ribs 62 that however are cross-sectionally rectangular. Nevertheless their design and effects are comparable to those of the ribs 60.

Figures 8, 9:
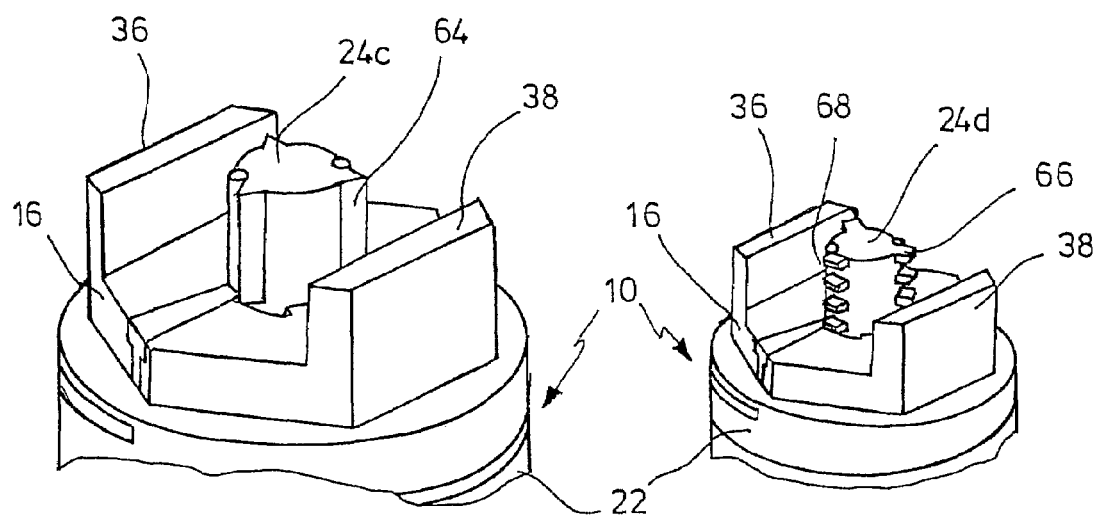

The shank 24c of FIG. 8 comprises cross-sectionally triangular ribs of which the radial extension also is larger than the diameter of at least the entry zone of the omitted passage.

The embodiment mode of FIG. 9 comprises a shank 24d fitted with three rows of protrusions 66 circumferentially spaced apart by 120° from one another and also being axially spaced apart. Each protrusion 66 is fitted with a radially outer bevel 68 at its underside to assure being easily deformed when the shank 24d enters the axial passage of the upper segment 10.

Again, the bumper is integrally molded in all embodiments shown in FIGS. 6 through 9. Diametrically opposite and cross-sectionally circular strands 68, 70 may be noted in the shanks 24a through 24d, said strands merging into radial elements 72 connecting to the external thread 22 during the injection molding of the bumper of the invention. The shank itself and the sleeve 14 on the other hand are made of a hard plastic.

What is claimed is:

1. An automobile hood bumper, comprising:
    a seat comprising a sleeve which has
        an axial passage, and
        an external thread adapted to be screwed into a hole of a support;
    an upper segment having a rest head and a shank;
    a connection member that releasably joins the shank to the seat to release said shank when an axial force acting on the upper segment exceeds a predetermined magnitude, whereby the shank moves into the axial passage until the rest head comes to rest at an associated end of said seat; and
    a deceleration element configured at least one selected from the group consisting of
        (i) an outside of the shank, and
        (ii) an inside of the axial passage,
    to generate a decelerating force by at least one selected from the group consisting of
        (a) friction,
        (b) elastic deformation, and
        (c) plastic deformation,
    and to decelerate the movement of the shank into the axial passage;
    wherein the decelerating element is configured such that the decelerating force remains approximately constant when the rest head is displaced until resting against the seat.

2. An automobile hood bumper, comprising:
    a seat comprising a sleeve which has
        an axial passage, and an external thread adapted to be screwed into a hole of a support;

an upper segment having a rest head and a shank;

a connection member that releasably joins the shank to the seat to release said shank when an axial force acting on the upper segment exceeds a predetermined magnitude, whereby the shank moves into the axial passage until the rest head comes to rest at an associated end of said seat; and a deceleration element configured at least one selected from the group consisting of
(i) an outside of the shank, and
(ii) an inside of the axial passage, to generate a decelerating force by at least one selected from the group consisting of
(a) friction,
(b) elastic deformation, and
(c) plastic deformation, and to decelerate the movement of the shank into the axial passage;

wherein the deceleration element is configured such that the deceleration force during the displacement of the rest head until said rest head rests on the seat increases or decreases gradually or continuously or step-wise.

3. An automobile hood bumper, comprising:

a seat comprising a sleeve which has
an axial passage, and
an external thread adapted to be screwed into a hole of a support;

an upper segment having a rest head and a shank;

a connection member that releasably joins the shank to the seat, wherein the seat, the connection member and the upper segment are molded integrally of plastic, and the connection member is configured to rupture or shear off to release said shank when an axial force acting on the upper segment exceeds a predetermined magnitude, whereby the shank moves into the axial passage until the rest head comes to rest at an associated end of said seat; and a deceleration element configured at least one selected from the group consisting of
(i) an outside of the shank, and
(ii) an inside of the axial passage, to generate a decelerating force by at least one selected from the group consisting of
(a) friction,
(b) elastic deformation, and
(c) plastic deformation, and to decelerate the movement of the shank into the axial passage.

4. The bumper as claimed in claim 3, wherein
a part of the rest head, the shank and the sleeve of the seat are molded of hard plastic; and
the external thread and a remainder of the rest head are molded of an elastomeric plastic.

5. The bumper as claimed in claim 4, wherein the seat further comprises, in addition to said sleeve, a radial flange at the end facing the rest head.

6. The bumper as claimed in claim 3, wherein the deceleration element comprises, on the outside of said shank, axially spaced annular ribs or a helical rib or radial protrusions.

7. The bumper as claimed in claim 3, wherein the deceleration element comprises, on at least one selected from the group consisting of (i) the outside of the shank and (ii) the inside of the axial passage, a protrusion adapted to be deformed during the movement of the shank into the axial passage.

8. The bumper as claimed in claim 7, wherein the protrusion comprises several axially parallel ribs.

9. The bumper as claimed in claim 8, wherein a cross-section of the ribs is arcuate, triangular or rectangular.

10. The bumper as claimed in claim 7, wherein the protrusion has a radial extension that increases toward the rest head.

11. The bumper as claimed in claim 8, wherein the protrusion has a radial extension that increases or decreases toward the rest head.

12. The bumper as claimed in claim 7, wherein the protrusion has a radial extension decreasing toward the rest head.

13. The bumper as claimed in claim 3, wherein the shank is conical and matched by a complementary conical shape of the axial passage.

14. The bumper as claimed in claim 3, wherein a diameter of the shank between the connection member and the rest head is larger than at least an entry zone of the passage to define said deceleration element.

15. The bumper as claimed in claim 3, further comprising guide elements at least one selected from the group consisting of
(i) the outside of the shank, and
(ii) the inside of the axial passage,
to axially guide the shank being displaced inside said axial passage.

16. An automobile hood bumper, comprising:

a seat comprising a sleeve which has
an axial passage, and
an external thread adapted to be screwed into a hole of a support;

an upper segment having a rest head and a shank;

a connection member that releasably joins the shank to the seat to release said shank when an axial force acting on the upper segment exceeds a predetermined magnitude, whereby the shank moves into the axial passage until the rest head comes to rest at an associated end of said seat; and a deceleration element configured at least one selected from the group consisting of
(i) an outside of the shank, and
(ii) an inside of the axial passage, to generate a decelerating force by at least one selected from the group consisting of
(a) friction,
(b) elastic deformation, and
(c) plastic deformation, and to decelerate the movement of the shank into the axial passage;

wherein the upper segment further comprises wrench/key faces; and the seat further comprises, at the is fitted at its end facing the rest head, two axially parallel protrusions defining therebetween a distance selected in a manner that the rest head is irrotationally situated between the protrusions when resting against the facing end of said seat.

17. An automobile hood bumper, comprising:

seat comprising a sleeve which has
an axial passage, and
an external thread adapted to be screwed into a hole of a support;

an upper segment having a rest head and a shank;

a connection member that releasably joins the shank to the seat to release said shank when an axial force acting on the upper segment exceeds a predetermined magnitude, whereby the shank moves into the axial passage until the rest head comes to rest at an associated end of said seat; and a deceleration element configured at least one selected from the group consisting of
(i) an outside of the shank, and
(ii) an inside of the axial passage,
to generate a decelerating force by at least one selected from the group consisting of
(a) friction,
(b) elastic deformation, and
(c) plastic deformation,
and to decelerate the movement of the shank into the axial passage;

wherein said bumper comprises a telescoping configuration of several seats and upper segments, where said upper segments are consecutively inserted into the associated seats when a predetermined force or impact is applied to the first upper segment.

18. The bumper as claimed in claim 9, wherein the cross-section of the ribs increases or decreases toward the rest head.

* * * * *